US012799804B2

(12) United States Patent
Tillegreen

(10) Patent No.: US 12,799,804 B2
(45) Date of Patent: Nov. 17, 2026

(54) SHIM, A SHIM SYSTEM AND A METHOD FOR BLOCKING UP BUILDING ELEMENTS

(71) Applicant: TILLEX V/KIM TILLEGREEN, Ringsted (DK)

(72) Inventor: Kim Tillegreen, Ringsted (DK)

(73) Assignee: TILLEX V/KIM TILLEGREEN, Ringsted (DK)

( * ) Notice: Subject to any disclaimer, the term of this patent is extended or adjusted under 35 U.S.C. 154(b) by 196 days.

(21) Appl. No.: 18/694,879

(22) PCT Filed: Sep. 22, 2022

(86) PCT No.: PCT/IB2022/058960
§ 371 (c)(1),
(2) Date: Mar. 22, 2024

(87) PCT Pub. No.: WO2023/047324
PCT Pub. Date: Mar. 30, 2023

(65) Prior Publication Data

US 2025/0116151 A1 Apr. 10, 2025

(30) Foreign Application Priority Data

Sep. 27, 2021 (DK) ............................. PA202100912

(51) Int. Cl.
*E06B 1/60* (2006.01)

(52) U.S. Cl.
CPC .................................. *E06B 1/6069* (2013.01)

(58) Field of Classification Search
CPC .. E06B 1/6069; E06B 3/5409; E04F 21/1877; E04F 21/0092; A47B 91/00; A47B 91/002
USPC ............... 52/126.1, 213; 254/104; 248/188.2
See application file for complete search history.

(56) References Cited

U.S. PATENT DOCUMENTS 1,045,984 A * 12/1912 King .................. E04G 17/0721 269/224
2,248,715 A * 7/1941 Mafera .................... F16M 7/00 254/104
2,524,961 A * 10/1950 Cramer, Jr. .............. F16M 7/00 254/104

(Continued)

FOREIGN PATENT DOCUMENTS

KR 20040059594 7/2004

OTHER PUBLICATIONS

PCT International Search Report for International Application No. PCT/IB2022/058960, Oct. 24, 2022, 2 pages.

*Primary Examiner* — James M Ference
(74) *Attorney, Agent, or Firm* — Meister Seelig & Schuster PLLC

(57) ABSTRACT

A shim, a shim system and a method for blocking up building elements. The shim comprises an elongated connecting element at a first surface. The elongated connecting element has a first connecting end connected to a main part of the shim, at a first end, and further comprises a second free end, arranged towards a second end of the main part. The shim further comprises an opening at a first surface, such that a second substantially identical shim can be connected to the shim with the first surfaces towards each other, by the free ends of each elongated connecting element extending into the opening of the other shim.

11 Claims, 3 Drawing Sheets

(56) References Cited

U.S. PATENT DOCUMENTS 2,539,703 A * 1/1951 Sato ...................... E04G 25/066 254/105
2,651,814 A * 9/1953 Lester, Jr. ............. E06B 1/6069 49/505
2,753,602 A * 7/1956 Ringle ...................... E06B 1/10 52/212
2,772,596 A * 12/1956 Trussell ................. B62D 17/00 425/DIG. 129
2,914,817 A * 12/1959 Jackson .................... E06B 1/52 49/505
3,030,730 A * 4/1962 Costar .................... A47B 91/02 248/668
3,171,632 A * 3/1965 Jines ........................ F16M 7/00 254/104
3,528,691 A * 9/1970 Matich, Jr. ............ F16D 1/0888 411/80
3,836,118 A * 9/1974 Meyer ................... E06B 3/5409 269/104
4,542,562 A * 9/1985 Okura ..................... F16G 11/04 403/109.5
4,637,098 A * 1/1987 Okura ..................... F16G 11/02 D8/394
4,713,922 A * 12/1987 Ingold ................... E06B 1/6069 52/656.2
4,776,548 A * 10/1988 Bezenek .................. F16M 7/00 D34/28
4,790,515 A * 12/1988 Pocci ................... B23Q 1/0054 254/104
4,830,320 A * 5/1989 Bellows ................. A47B 91/12 248/188.2
4,939,821 A * 7/1990 Frank, Jr. ............... H02G 7/056 24/115 M
H906 H * 4/1991 Baggett ...................... 403/409.1
5,050,273 A * 9/1991 Okura ..................... F16L 3/133 248/58
5,054,250 A * 10/1991 Foss ...................... E06B 1/6069 52/211
5,090,664 A * 2/1992 McCullough ........ B23Q 1/0054 254/7 C
5,142,745 A * 9/1992 Setty ....................... F16G 11/02 24/115 M
5,253,964 A * 10/1993 Swemmer ............... E21D 20/00 411/79
5,322,132 A * 6/1994 Franks, Jr. ............. H02G 7/056 174/41
5,566,414 A * 10/1996 Nonaka ................... E01D 19/04 14/77.1
5,685,677 A * 11/1997 Langley .................... F16B 2/14 411/33
5,953,862 A * 9/1999 Earhart ............... E04F 13/0853 52/98
6,018,916 A * 2/2000 Henry ................... E06B 1/6069 52/211
6,155,004 A * 12/2000 Earhart ............... E04F 13/0853 52/217
6,560,934 B1 * 5/2003 Workman ............ E06B 1/6069 52/204.56
6,581,251 B2 * 6/2003 Malin ..................... F16G 11/02 174/79
7,520,483 B2 * 4/2009 Rand ........................ A47G 7/02 248/346.11
7,703,727 B2 * 4/2010 Selness ................ A47B 91/028 248/188.2
7,784,751 B1 * 8/2010 Bellows ................. A47B 91/00 248/346.11
8,813,437 B1 * 8/2014 Spofford ............... E06B 1/6069 52/213
8,870,161 B2 * 10/2014 Doty ....................... B25B 27/14 81/485
10,130,174 B2 * 11/2018 Perrin ...................... B23Q 1/58
2003/0102468 A1 * 6/2003 Selzer .................... A62B 3/005 254/104
2003/0145531 A1 * 8/2003 Holder ..................... F16M 7/00 52/98
2003/0151035 A1 * 8/2003 Stephen ................. A62B 3/005 254/104
2004/0168376 A1 * 9/2004 Norgaard .............. E06B 1/6069 52/127.2
2010/0139199 A1 * 6/2010 Slott ................. E04F 15/02044 52/698
2015/0027082 A1 * 1/2015 Hoffman ............. E04F 21/1877 52/749.11
2025/0116151 A1 * 4/2025 Tillegreen ............. E06B 1/6069

* cited by examiner

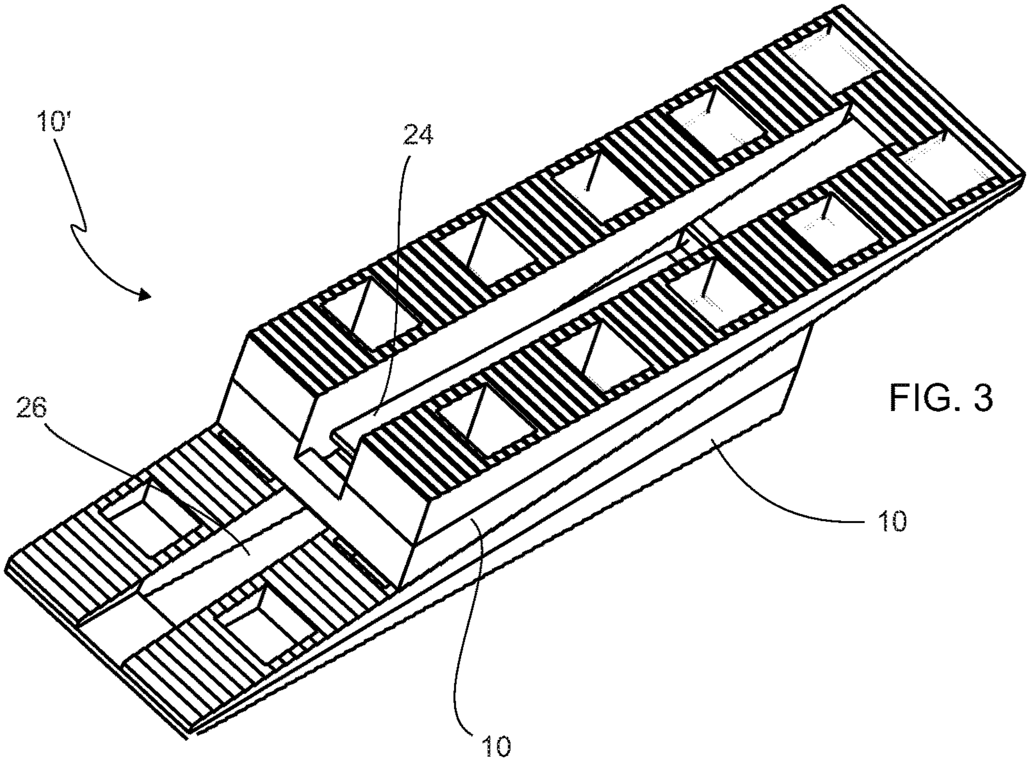
FIG. 3
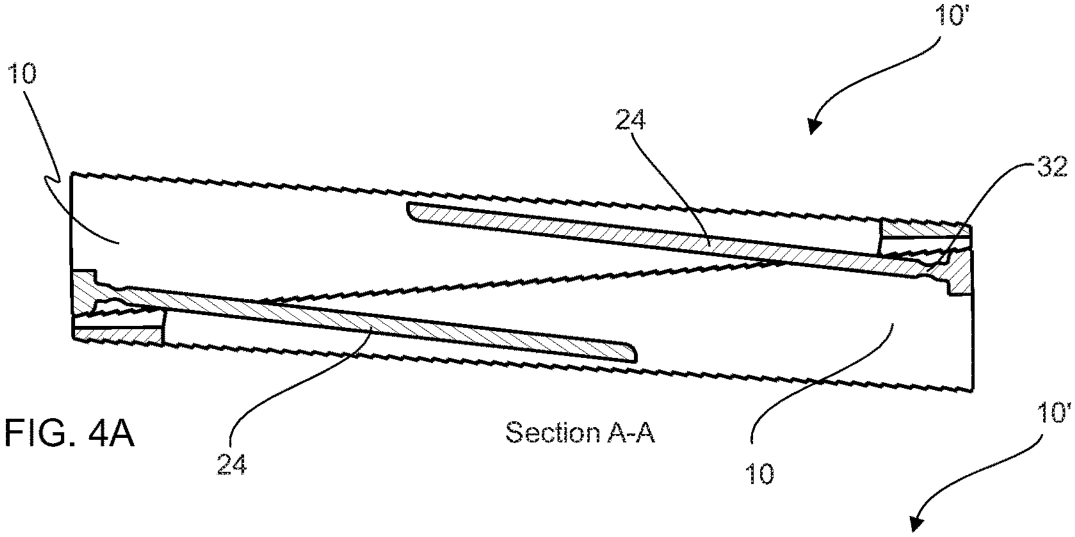
FIG. 4A
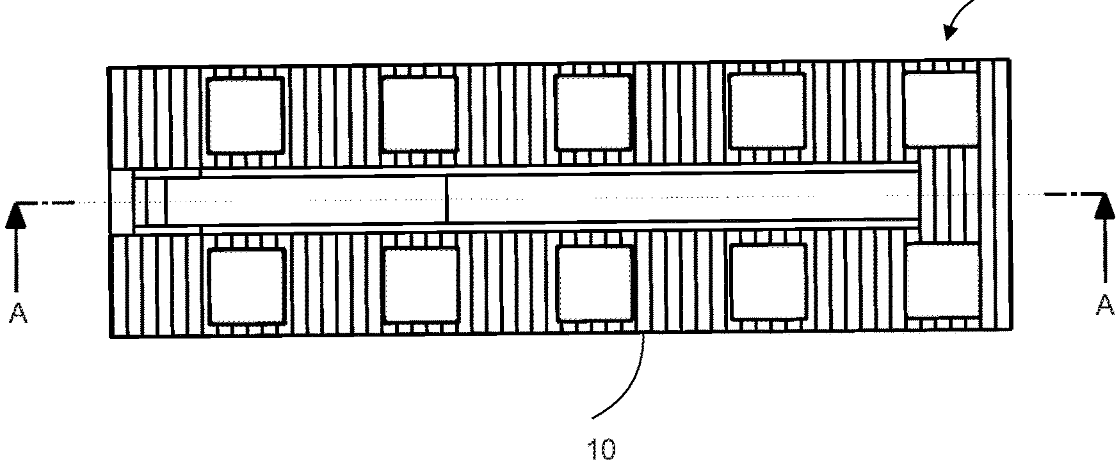

FIG. 4B
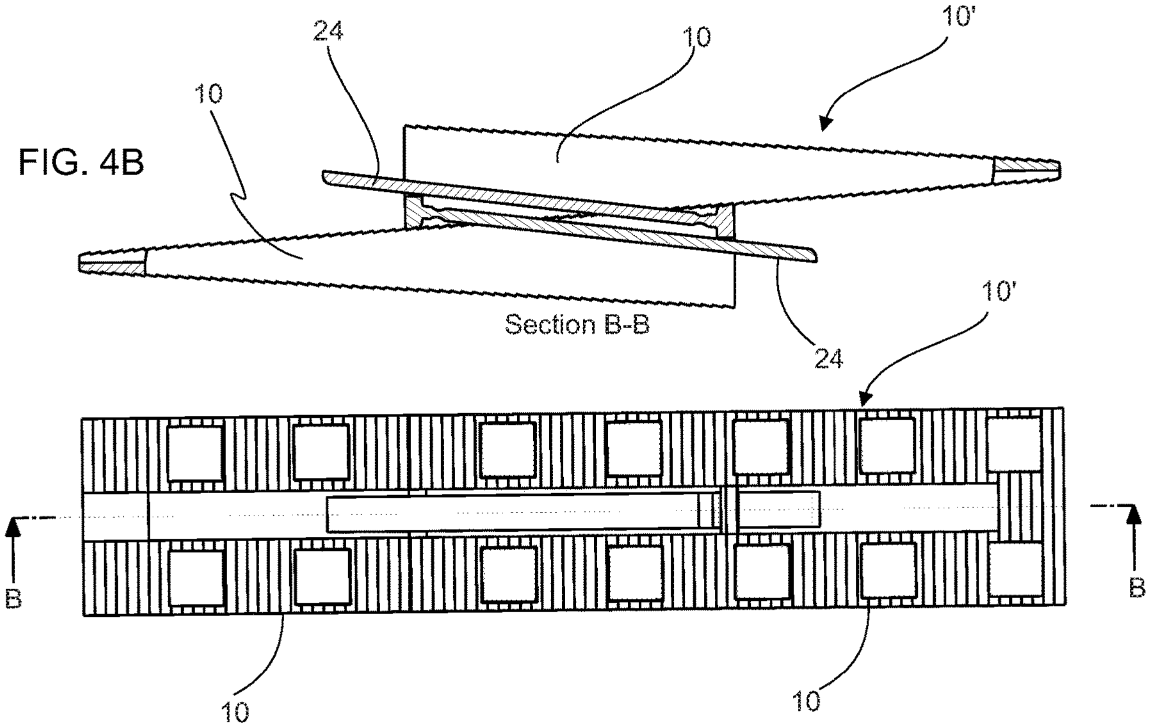
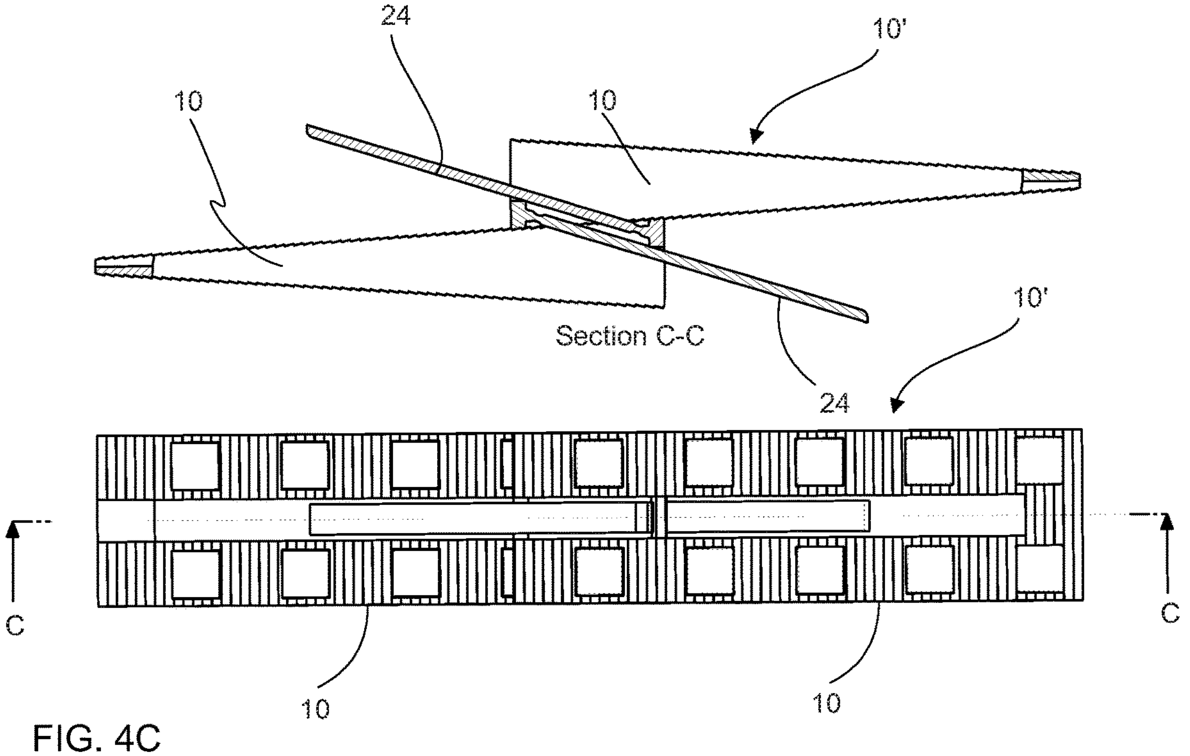
FIG. 4C

SHIM, A SHIM SYSTEM AND A METHOD FOR BLOCKING UP BUILDING ELEMENTS

TECHNICAL FIELD

The present invention relates to a shim element, a shim system and a method for blocking up building elements.

BACKGROUND OF THE INVENTION

The technique of blocking-up building elements, such as floors, windows, doors, or elements such as machinery, which has to be in level, by using two opposed wedges arranged on top of each other is well known.

The technique involves a number of similar, wedge-shaped shims comprising a top and bottom surface provided with a friction surface, comprising rows of teeth (as disclosed in EP 0 844 344 A1) for creating a friction in the longitudinal direction of the wedge-shaped shim.

Such wedge-shaped shims are simple to manufacture and simple to use, and provide good results for avoiding slippage between the shim and another element, such as a construction element of another shim, in the longitudinal direction of the shim and perpendicular to the rows of teeth.

However, when using two of such wedge-shaped shims on top of each other, the two shims may be difficult to align with each other, and when misaligned or even perfectly aligned, tend to slip or move in relation to each other, such that the two shims move in relation to each other in a sideways direction of the shims. Hereby, the blocked-up building elements or machinery may become unstable.

Further, due to the possible sideways movement, the positioning of the individual shims is difficult for the person installing the shims, as care must be taken for positioning the shims correctly in relation to each other and also in relation to the building element or machinery.

Examples of shim systems avoiding the above-described problem are disclosed in EP 2 078 800 B1 or GB 2404388 A. The documents disclose a system comprising two wedges, which are aligned and mutually correctly positioned by providing the wedges with a flange at one end of the wedge of a system having longitudinal ridges/grooves arranged at the top and bottom surface for engagement with a corresponding wedge.

These known systems however comprise a complicated construction and are not suitable to be used both in the system and as individual wedge elements.

Another example of a shim is disclosed in U.S. Pat. No. 8,813,437 B1. This document discloses a shim system where the top shim has a connecting part that can be connected to the bottom part in order to control the overlap and thus the height of the shim system. The system discloses an arrangement having two differently constructed shim parts arranged connectably to each other. The arrangement is however rather complicated and due to the construction only gives a limited degree of adjustment. The claimed invention thus differs from DI by the characterising features of claim 1.

It is an object of the present invention to provide a simple and effective shim and a shim system where the individual shims are easy to manufacture, easy to use in operation as a system having at least two shims, where transverse unintentional displacement between the two shims is avoided, and where the shim is still optimal to use as a single shim.

The above object and advantages, together with numerous other objects and advantages, which will be evident from the description of the present invention, are according to a first aspect of the present invention obtained by:

A shim for blocking up building elements, such as floors or windows/doors, where the shim comprises a main part having a first surface and a second surface, a first and second end, and first and second sides, wherein the shim comprises an elongated connecting element at the first surface, the elongated connecting element having a first connecting end connected to the main part at the first end, and a second free end arranged towards the second end of the main part, and wherein the shim comprises an opening at the first surface, such that a second substantially identical shim can be connected to the shim with the first surfaces towards each other, by the free ends of each elongated connecting element extending into the opening of the other shim.

The shim is preferable a wedge-shaped shim which is manufactured by known techniques, such as being injection molded from a plastic material such as polyethylene (PE). The shim may be manufactured from other suitable materials known to the skilled person.

The shim comprises a first surface and a second surface which are arranged with a mutual, oblique angle defining the wedge-shape. The angle between the first and second surface may vary depending on the actual needs of the shim. Further, the shim may also be manufactured with different dimensions, such as different heights. In one embodiment, the shim may have a narrow pointy end and a broad opposite end, or in another embodiment the shim may be manufactured as a blunt wedge, where the narrow end of the wedge is blunt, and the broad end is arranged with a higher dimension. Hereby is it possible to arrange a number of differently dimensioned wedge-shaped shims which may be used together depending on the needs.

Alternatively, the shim may be manufactured by the same known processes but have first and second surfaces which are parallel.

Preferably, the shim comprises a surface pattern for creating a friction surface on the first and/or second surface of the main part. The surface pattern may be arranged as rows of teeth for creating friction in the direction between the first and second end.

Alternatively, the surface pattern may be arranged as staggered rows of projections for creating a friction in the direction between the first and second end and in the direction between the first and second side.

According to a further embodiment of the first aspect of the invention, the elongated connecting element is connected to said main part at an edge of said opening.

The elongated connecting element, which is part of the shim, is preferably connected to the main part of the shim at an edge of the opening. The elongated connecting element is preferable connected at the edge of the opening, within the opening, such that the junction between the elongated connecting element at the main part are located below the first surface, i.e., in the opening between the first surface and the second surface. It is hereby possible to use the shim as a single-type shim and to use the shim in a shim system comprising two or more individual shims. When using the shim as a single shim, it is necessary that the elongated connecting element does not project from the first surface, hereby interfering with the connection between the shim and the blocked-up element.

According to a further embodiment of the first aspect of the invention, the elongated connecting element is flexible, such that the elongated connecting element may be forced out of a neutral start position and bias back into the neutral start position.

However, due to the arrangement of the flexible elongated connecting element and the opening, where the elongated connecting element projects from the first surface of the shim, it is possible to force the elongated connecting element into the opening, such that it does not project from the first surface. This has the advantage that the shim may be used as a common-type single shim. The shim is preferably manufactured from a plastic, such as PU, such that the material in itself provides some flexibility.

Where the material provides the flexibility, it is preferred that the connecting element is arranged with a width which is larger than the thickness, such that the connecting element may bend out of the opening but not in the transverse direction.

According to a further embodiment of the first aspect of the invention, the elongated connecting element comprises a weakening at the connecting end, the weakening acting as a hinge, such that the elongated connecting element may be forced out of a neutral start position and bias back into the neutral start position.

The shim may however alternatively or additionally also be arranged such that the elongated connecting element comprises a weakening, which increases or provides the flexibility of the elongated connecting element in the direction through the opening, but not in the transverse direction of the shim. The elongated connecting element may hereby more easily be bend into and/or out of the opening. The connecting element may thus be arranged from a flexible material which provides the desired flexibility, but remains substantially stiff in the transverse direction.

Where the weakening provides the necessary flexibility, the shape of the elongated element is not crucial.

According to a further embodiment of the first aspect of the invention, the first and second sides are longitudinal sides defining a length of the shim, the elongated connecting element having a length spanning the majority of the length of the shim.

A shim where the elongated connecting element has a length which spans the majority of the shim has the effect that the degree of adjustment between two similar interconnected shims is relatively large and the elongated connecting elements still give the necessary locking effect in the transverse direction. The elongated connecting element may however be shorter if a smaller degree of adjustment is needed.

According to a further embodiment of the first aspect of the invention, the first and second surfaces are arranged at an angle in relation to each other, hereby forming a wedge.

The shim preferably has a wedge shape, such that two interconnected shims, when connected and displaced in relation to each other, give the necessary variation in height of the two shims.

According to a further embodiment of the first aspect of the invention, the elongated connecting element is integrated with the main part.

The elongated connecting element is preferably integrated with the main part, such as manufactured from the same material, e.g., extruded from PU as a single element. In case the functionality of the elongated connecting element is not needed, the connecting element may simply be cut off by a suitable tool, and the shim has only the function of a standard shim, known with technical field.

Alternatively, the elongated connecting element may be part of the shim, as an independent element, which is releasably connected to the wedge at the first end. The wedge and the elongated connecting element may therefore comprise releasable coupling elements, such as a releasable joint.

According to a further embodiment of the first aspect of the invention, the elongated connection element is arranged at an oblique angle in relation to said first surface.

Arranging the elongated connecting element at an oblique angle in relation to the first surface creates the possibility of interconnecting two shims by sliding the shims towards and over each other, instead of arranging them on top of each other before connecting. The connection between the two shims remains during the slidable displacement of the two shims. When two shims are connected and displaced to a maximum height, the connecting ends of the two elongated connecting elements are arranged at a minimum intermediate distance and provides a stop position for further displacement.

According to a second aspect of the present invention, the above objects and advantages are obtained by:

A shim system comprising two shims according to any of claims 1-8.

By arranging a shim system as defined above, it is possible to arrange a system where the individual shims are easy to manufacture, easy to use in operation, where the system has at least two shims for blocking-up building elements, where a transverse unintentional displacement between the two shims is avoided, and where each shim is still optimal to use as a single shim.

According to a third aspect of the present invention, the above objects and advantages are obtained by:

A method of for blocking up building elements comprising the following steps:

providing at least two shims as defined above, or a system as defined above, arranging the two shims with the first surfaces and the first ends toward each other, and engaging said shims by moving said shims towards each other, such that said elongated connecting elements project into the opening of the other shim.

The above-defined method defines a method where the blocking-up of building elements is easily accomplished by using the defined shims, and where any unintentional transverse movement of the shims is avoided during intermediate positioning of the shims, and during the blocking-up of the building elements.

FIG. 3 shows a second perspective view of a shim system.

FIG. 4A shows a top view of a shim system and a cross section of the shim system.

FIG. 4B shows a top view of a shim system and a cross section of the shim system.

FIG. 4C shows a top view of a shim system and a cross section of the shim system.

Figure 1:
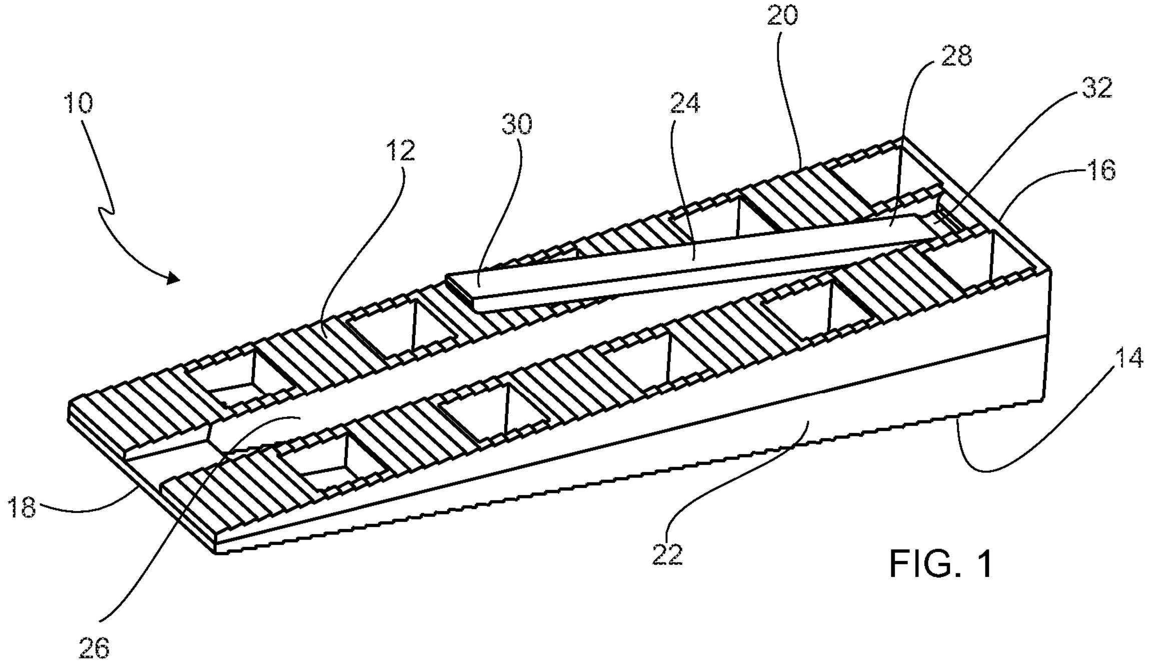
FIG. 1 shows a perspective view of a shim.

The present invention will now be described more fully hereinafter with reference to the accompanying drawings, in which exemplary embodiments of the invention are shown. The invention may however be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus not be described in detail with respect to the description of each figure.

FIG. 1 shows a perspective view of a shim 10. The shim 10, which is manufactured from a plastic material such as polyethylene (PE) or any other suitable material is shown having a generally wedge-shaped profile. The shim 10 thus functions as a commonly known wedge, but may alternatively be manufactured as a flat shim, which typically functions as a spacer when blocking up, e.g., building elements.

The shim 10 has a first surface 12, and a second surface 14, a first 16 and second end 18, and first 20 and second sides 22.

The shim 10 is shown having a surface structure which provides a friction in the longitudinal direction of the shim 10, which friction prevents slippage between the shim 10 and a building element, or if used in a shim system, having two or more shims, arranged on top of each other, preventing any slippage between the individual shims 10 and the shims and the building element. The surface structure of the shim 10 is shown as rows of teeth, but may alternatively be arranged as staggered rows of projections for creating a friction in the direction between the first 16 and second end 18 and in the direction between the first 20 and second side 22. The shim 10 is further shown with a number of square openings on the first surface 12 and the second surface, which are preferably not through-going, such that a fastener, such as a screw of nail, may be driven through the shim 10 and into a neighbouring structure, such as a building element.

The shim 10 is shown having an opening 26, which is shown as a longitudinal through-going opening 26, extending between the first surface 12 and the second surface 14. The opening 26 is shown extending substantially the entire length of the shim, but may be arranged such that the opening only extends part of the length of the shim 10.

The shim 10 is further shown having an elongated connecting element 24 arranged at the first surface 12 of the shim 10. The elongated connecting element 24 has a first connecting end 28 connected to the wedge shape at said first end 16, and a second free end 30 arranged towards the second end 18 of the wedge.

Arranging the shim 10 with an opening 26 and the elongated connecting element 24, as illustrated, provides the possibility of interconnecting two substantially similar shims 10 such that a second substantially similar shim 10 can be connected to a first shim 10, with the first surfaces 12 towards each other, with the free ends 30 of each elongated connecting element 24 extending into the opening 26 of the other shim 10.

Figure 2:
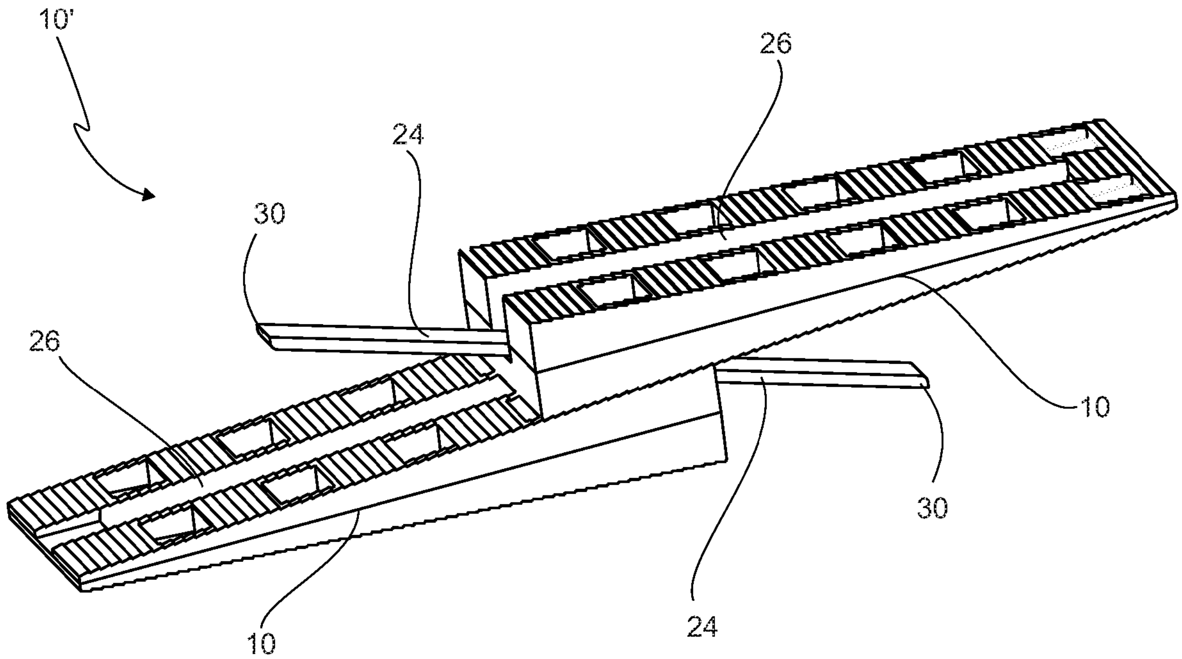
FIG. 2 shows a first perspective view of a shim system.

Hereby is arranged a shim system 10' as shown in FIG. 2, where the two shims 10 are displaceable in relation to each other in the longitudinal direction of the shims 10, but locked for displacement in the transverse direction, due to the elongated connecting elements 24 and the openings 26.

However, due to the arrangement of the elongated connecting element 24 and the opening 26, where the elongated connecting element 24, as shown, projects from the first surface 12, it is possible to force the elongated connecting element into the opening, such that it does not project from the first surface 12. The shim 10 may hereby be used as a common-type single shim.

The elongated connecting element 24 is preferably arranged flexible. As the shim 10 is preferably manufactured from a plastic, such as PU, the material provides some flexibility in itself. The shim 10 may however also be arranged, such that the elongated connecting element comprises a weakening 32 (also shown in FIG. 4A), which increases the flexibility of the elongated connecting element 24 in the direction through the opening 26, but not in the transverse direction of the shim 10. The elongated connecting element may hereby more easily be bent into and/or out of the opening 26.

The weakening 32 is shown arranged in the proximity of the junction between the elongated connecting element 24 and the first end 16. The weakening 32 may however also be arranged in the junction itself or arranged at a further distance from the junction than illustrated.

In the shown embodiment, the elongated connecting element 24 is part of the shim 10 and integrated into the wedge, but may in an alternative embodiment be part of the shim 10, as an independent element, which is releasably connected to the wedge at the first end 16. The wedge and elongated connecting element may therefore comprise releasable coupling elements, such as a releasable pivot joint.

FIG. 2 shows a first perspective view of a shim system 10'. The two illustrated shims 10 each comprise an elongated connecting element 24 at the first surface 12, where the elongated connecting elements 24 have a first connecting end 32 (shown in FIG. 1), and a second free end 30 arranged towards the second end of the main part. Each shim 10 comprises an opening 26 at the first surface 12, such that the shims 10 are connected to each other with the first surfaces 12 towards each other and by the free ends 30 of each elongated connecting element 24 extending into the opening of the other shim 10. The figure shows a position of the two interconnected shims 10, where the shims 10 provides a maximum height of the shim system 10', i.e., the two shims 10 are displaced in relation to each other, such that the connecting ends 32 are arranged at a minimum distance in relation to each other, hereby functioning as a stop for further displacement.

FIG. 3 shows a second perspective view of a shim system 10'. FIG. 3 shows a similar shim system 10' as illustrated in FIG. 2 but illustrated with the shims 10 having a not fully interconnected position. The two shims 10 are interconnected in the same manner as in FIG. 2, but may be further displaced in relation to each other, such that the height of the shim system 10' may be further increased.

FIG. 4A-4C show a top view and a cross section of a shim system 10'. FIG. 4A-4C show three different positions of the shim system 10'.

Of the three embodiments, FIG. 4A show a shim system 10' having the least total height. The two shims 10 are illustrated directly on top of each other, with the elongated connecting elements 24 each projecting into the opening 26 of the other shim. The shim system 10' hereby prevents the shims from moving transversely in relation to each other, in relation to the longitudinal direction of the shims and/or in relation to the longitudinal direction of the elongated connecting elements 24.

FIG. 4A further illustrates the weakening 32 arranged on the elongated connecting element 24 at the connecting end 28, as described above in relation to FIG. 1.

FIG. 4B shows a further embodiment of the shim system 10' illustrated in FIG. 4A, but with the two shims 10 being further displaced in relation to each other with the result of an increased height of the shim system 10'.

FIG. 4C shows the position of the two shims 10, in which the shim system 10' has the most expanded height and the connecting ends 28 of the elongated connecting elements 24 are arranged with a minimum distance.

In the following is given a list of reference signs that are used in the detailed description of the invention and the drawings referred to in the detailed description of the invention.

10 Shim
10' Shim system
12 First surface
14 Second surface
16 First end
18 Second end
20 First side
22 Second side
24 Elongated connecting element
26 Opening
28 Connecting end
30 Free end
32 Weakening

The invention claimed is:

1. A shim for blocking up building elements, wherein said shim comprises a main part having a first surface, and a second surface, a first broad end and a second narrow end and first and second sides, said shim comprises an elongated connecting element at said first surface, characterized in that said elongated connecting element having a first connecting end connected to said main part at said first broad end, and a second free end arranged towards said narrow second end of said main part, and wherein said shim comprises a through-going opening at said first surface extending completely to said second surface, such that a second substantially identical shim can be connected to said shim with said first surfaces towards each other, by the free ends of each of the elongated connecting elements extending into and through the through-going opening of the other shim at the first surface of the other shim and through to the second surface of the other shim.

2. The shim according to claim 1, wherein said elongated connecting element is connected to said main part at an edge of said through-going opening.

3. The shim according to claim 1, wherein said elongated connecting element is flexible, such that said elongated connecting element is configured to be forced out of a neutral start position and bias back into said neutral start position.

4. The shim according to claim 1, wherein said elongated connecting element comprises a weakening at said connecting end, said weakening acting as a hinge, such that said elongated connecting element is configured to be forced out of a neutral start position and bias back into said neutral start position.

5. The shim according to claim 1, wherein said first and second sides are longitudinal sides defining a length of said shim, said elongated connecting element having a length spanning the majority of the length of said shim.

6. The shim according to claim 1, wherein said first and second surfaces are arranged at an angle in relation to each other, thereby forming a wedge.

7. The shim according to claim 1, wherein said elongated connecting element is integrated with said main part.

8. The shim according to claim 1, wherein said elongated connection element is arranged at an oblique angle in relation to said first surface.

9. A shim system comprising two shims according to claim 1.

10. A method for blocking up building elements comprising:

providing at least two shims according to claim 1, arranging said two shims with said first surfaces and said first broad ends toward each other, engaging said shims by moving said shims towards each other, such that the elongated connecting element of each of the at least two shims projects into the through-going opening of the other shim.

11. The shim according to claim 1, wherein at least one of the first and second surfaces comprises a plurality of teeth configured to engage a plurality of teeth on a corresponding one of the first or second surfaces of the other shim.

* * * * *